United States Patent [19]

Maramatsu

[11] Patent Number: 4,828,070
[45] Date of Patent: May 9, 1989

[54] APPARATUS FOR CONTROLLING THE SHIFT BETWEEN TWO AND FOUR-WHEEL DRIVINGS

[75] Inventor: Michiyasu Maramatsu, Hamamatsu, Japan

[73] Assignee: Fuji Tekko Co., Ltd., Shizuoka, Japan

[21] Appl. No.: 77,373

[22] Filed: Jul. 24, 1987

[30] Foreign Application Priority Data

Apr. 10, 1987 [JP] Japan .................. 62-89548

[51] Int. Cl.⁴ .............. B60K 17/344; B60K 23/08
[52] U.S. Cl. .................. 180/247; 364/424.01
[58] Field of Search ............ 180/247, 233, 197; 364/424.1; 74/866

[56] References Cited

U.S. PATENT DOCUMENTS

4,560,025 12/1985 Suzuki et al. ............ 180/247
4,592,442 6/1986 Wilson et al. ............ 180/247

FOREIGN PATENT DOCUMENTS

71221 4/1983 Japan .................. 180/247
119424 6/1986 Japan .................. 180/247
61-119425 6/1986 Japan .................. 180/247
285135 12/1986 Japan .................. 180/233

Primary Examiner—Charles A. Marmor
Assistant Examiner—Mitchell J. Hill
Attorney, Agent, or Firm—Lowe, Price, LeBlanc, Becker & Shur

[57] ABSTRACT

An improved apparatus for controlling the shift between two and four-wheel drivings comprises sensors for detecting the revolution velocities of a propeller and axle shafts, and a calculation unit for calculating a predetermined time duration during which the difference of the revolution velocities is less than a predetermined value after a shift member of the propeller shaft is shifted. A shift member of the axle shaft is shifted at a time during the predetermined time duration to be calculated by the calculation unit so that the shift is smoothly performed from two to four-wheel drivings without producing any gear sound or noise even in a high speed running.

4 Claims, 6 Drawing Sheets

APPARATUS FOR CONTROLLING THE SHIFT BETWEEN TWO AND FOUR-WHEEL DRIVINGS

FIELD OF THE INVENTION

The invention relates to an apparatus for controlling the shift between two and four-wheel drivings, and more particularly to an apparatus for controlling the shift between two and four-wheel drivings in which the shift is smoothly performed without producing any gear sound or noise even in a high speed running thereby improving the durability of a gear shift system of a four-wheel driving car.

BACKGROUND OF THE INVENTION

One of conventional apparatuses for controlling the shift between two and four-wheel drivings is described in Japanese Patent laid open No. 61-119425 (119425/1986). The apparatus for controlling the shift between two and four-wheel drivings comprises a first sensor for detecting a shift member of a transfer means to be shifted, and a second sensor for detecting a revolution velocity of a propeller shaft wherein a shift member of an axle shaft is shifted when the second sensor detects the revolution velocity of the propeller shaft to be increased up to a transient building-up level whereby the shift is finished from two to four-wheel drivings.

In the conventional apparatus for controlling the shift between two and four-wheel drivings, however, the shift is not performed from two to four-wheel drivings as smoothly as expected because the shift member of the axle shaft is delayed to be actuated, for instance, by 0.07 to 0.1 sec. so that the difference of revolution velocities is occured between the propeller and axle shafts for the reason why such a delaying time can not be actually avoided in actuating any mechanical means.

SUMMARY OF THE INVENTION

Accordingly, it is an object of the invention to provide an apparatus for controlling the shift between two and four-wheel drivings in which a shift member of an axle shaft is shifted at a precise timing to result in four-wheel driving.

It is a further object of the invention to provide an apparatus for controlling the shift between two and four-wheel drivings in which a shift is performed smoothly from two to four-wheel drivings without producing any gear sound or noise even in a high speed running.

According to the invention, an apparatus for controlling the shift between two and four-wheel drivings comprises, first means for detecting a revolution velocity of a propeller shaft for wheels to which driving torque is interrupted to be conveyed under two-wheel driving condition, second means for detecting a revolution velocity of an axle shaft for said wheels, means for calculating a predetermined time duration during which the difference of the revolution velocities is less than a predetermined value between said propeller and axle shafts in accordance with the revolution velocities thereof detected by said first and second means when a shift member of a transfer means is shifted from two to four-wheel driving conditions, and means for controlling a shift member of said axle shaft to be shifted during said predetermined time duration whereby the shaft is finished from two to four-wheel drivings.

BRIEF DESCRIPTION OF THE DRAWINGS

The invention will be explained in more detail in accordance with following drawings wherein.

DETAILED DESCRIPTION OF PREFERRED EMBODIMENTS

Figure 1:
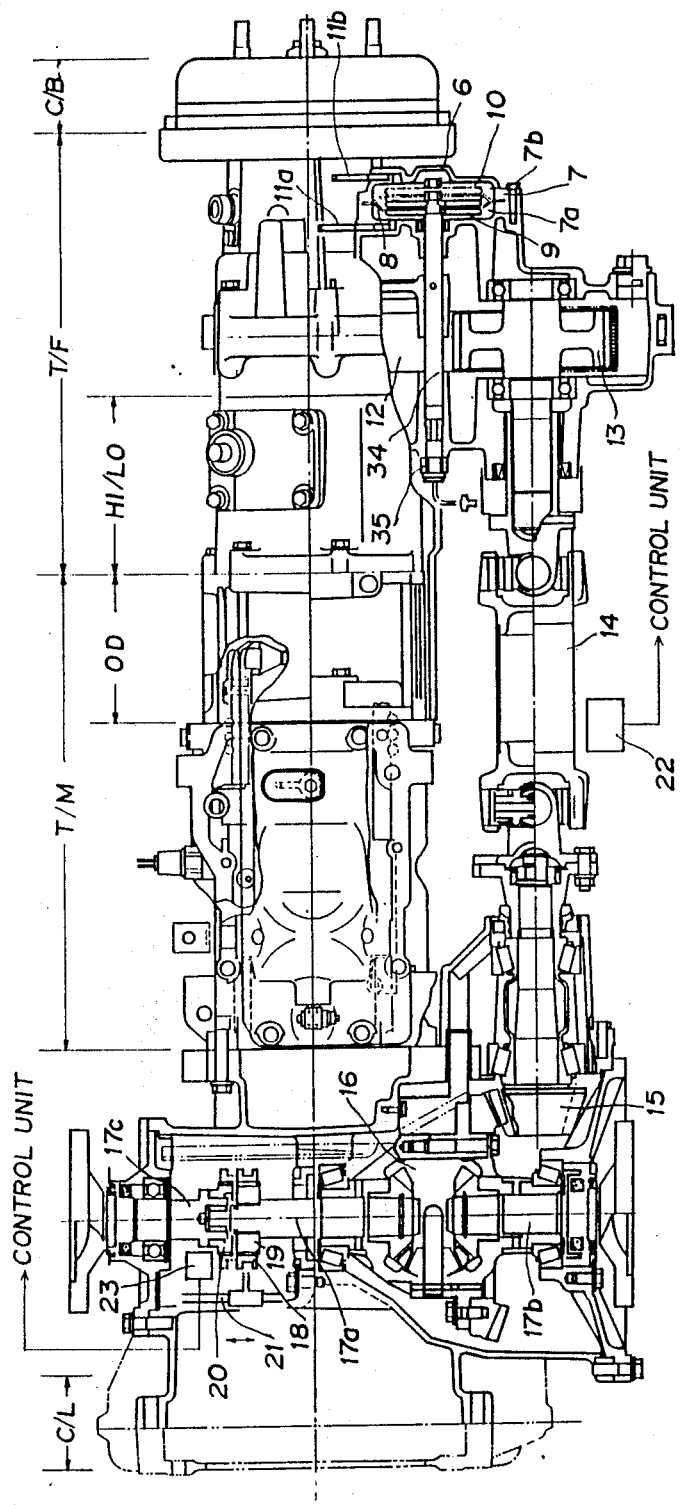
FIG. 1 is a plain view partly exploded illustrating an embodiment according to the invention.
Figure 2:
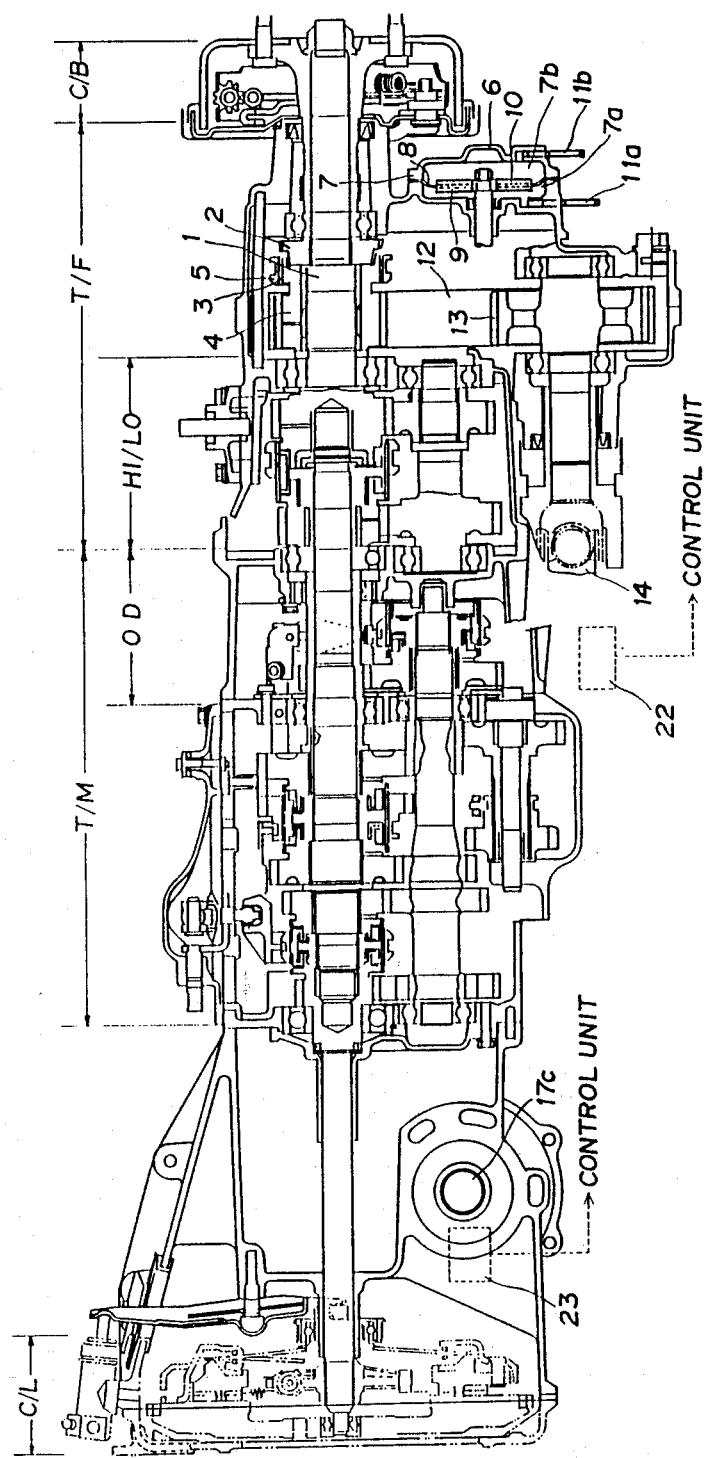
FIG. 2 is a side longitudinal cross sectional view illustrating the embodiment according to the invention.

In FIGS. 1 and 2, there is shown an apparatus for controlling the shift between two and four-wheel drivings which comprises a clutch means C/L, a transmission means T/M including an over-drive means OD, and a transfer means T/F including a center brake means C/B and high/low shifting means HI/LO. In the transfer means T/F, an output shaft 1 is provided with a clutch gear 2 and freely with a sprocket drive 4 having a hub 3. The hub 3 is provided in spline connection with a sleeve 5 which is shifted by a shift fork (not shown). For the shift of the sleeve 5, or first shift member, as shown in FIG. 2, there are provided a vacuum means 6 which comprises a diaphragm 10 being composed of a rubber sheet 8 fixed to a cylinder 7 and metal plates 9 layered on the both surfaces of the rubber sheet 8, and pipes 11a and 11b for supplying negative pressure to cylinder chambers 7a and 7b separated by the diaphragm 10. The vacuum means 6 is connnected to a shift rod 34 which actuates a switch 35 for detecting the shift of the sleeve 5 from two to four-wheel drivings. The sprocket drive 4 is connected to a corresponding sprocket driven 13 by a chain 12 thereby rotating propeller shaft 14. The propeller shaft 14 is connected through a bevel gear 15 to a differential means 16 which distributes driving torque to axle shafts 17a and 17b for front wheels. The axle shaft 17a is provided with a hub 19 having a sleeve 18 fixed in spline connection thereto, while an axle shaft 17c which is to be connected to the axle shaft 17a or second shift member, as shown in FIG. 1, is provided with a clutch gear 20. The sleeve 18 is shifted by a shift fork (not shown) fixed to a shift rod 21 to be moved in the direction of an arrow by a vacuum means (not shown). A revolution velocity of the aforementioned propeller shaft 14 is detected by a sensor 22, while that of the axle shaft 17c is detected by a sensor 23.

Figure 3A:
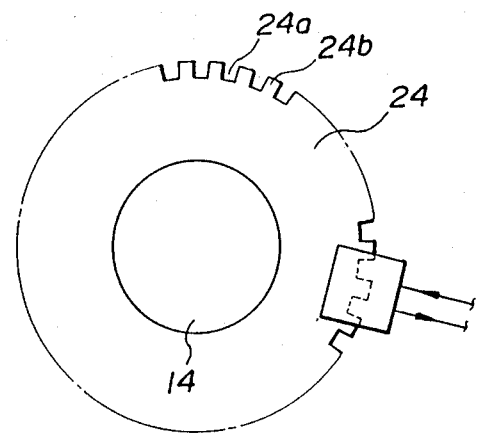
FIGS. 3A and 3B are explanatory views illustrating a sensor in the embodiment according to the invention.
Figure 3B:
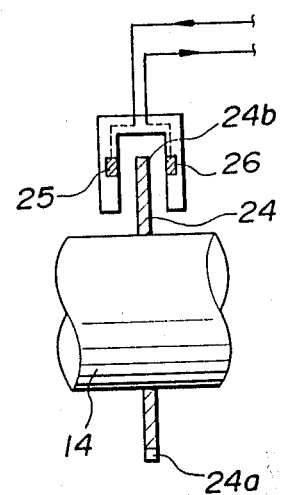

In FIGS. 3A and 3B, there is shown the sensor 22 which comprises a wheel 24 fixed on the outer surface of the propeller shaft 14 to be rotated together, a light emitting diode 25, and a phototransistor 26. The wheel 24 is formed at the outer periphery to have concave portions 24a and convex portions 24b so that light from the diode 25 is passed through the concave portions 24a to be received by the transistor 26, and is interrupted by the convex portions 24b.

Figure 4A:
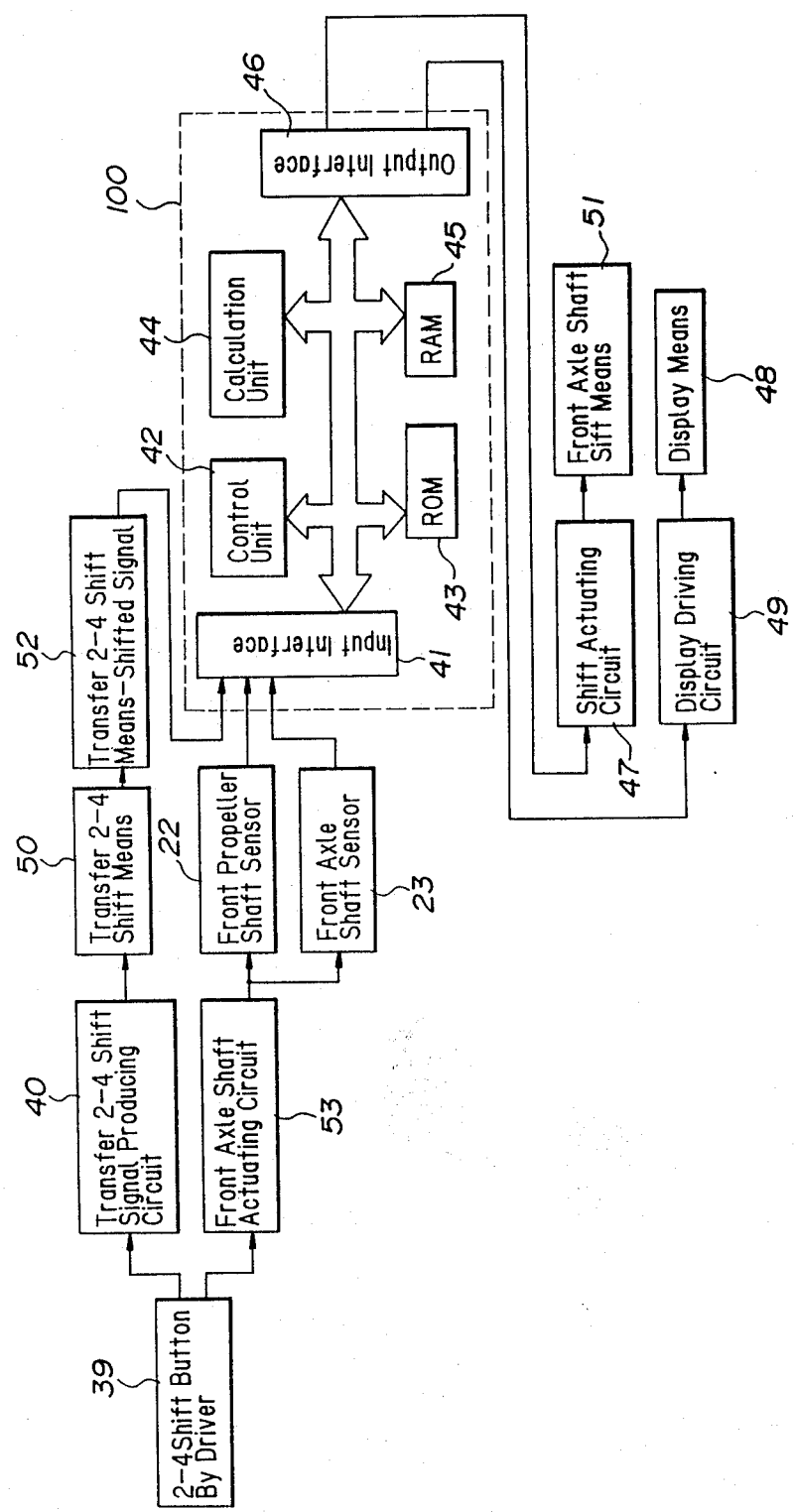
FIG. 4A is a block diagram illustrating the embodiment according to the invention.
Figure 4B:
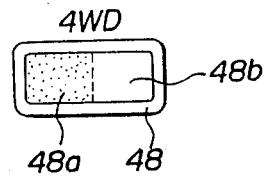
FIGS. 4B and 4C are explanatory diagrams showing a display means in the embodiment according to the invention.

FIG. 4B shows control system in the embodiment according to the invention which are started to be operated by a two to four-wheel drive shifting button 39 which is to be turned on by a driver in a car so that a transfer means shift system and front axle shift system are actuated separately. The transfer means shift system comprises a circuit 40 for producing a signal by which the vacuum means 6 is to be shifted from two to four-wheel driving conditions, a driving circuit 50 for shifting a shift member of the transfer means in accordance with the signal from the circuit 40, and a circuit 52 for producing a signal which is input to an input interface 41 to inform a control unit that the shift member is shifted in the transfer means. The front axle shift system comprises a circuit 53 for producing a signal by which a system indicated by a reference numeral 100 is actuated to control the front axle shift member to be shifted from two to fourwheel drivings at a predetermined timing to be calculated therein in accordance with the turning on of the button 39 by the driver. In the system 100, the sensors 22 and 23 are actuated to output signals of the revolution velocities of the propeller and front axle shafts 14 and 17c to a control unit 42. The control unit 42 controls a calculation unit 44 to conduct predetermined calculations in accordance with programs stored in ROM 43, and RAM 45 to memorize data and results of the calculations temporarily during the calculation process. As a result, control signals are output from an output interface 46 to which a shift driving circuit 47 for shifting the shift member including the sleeve 18 connecting the axle shafts 17a and 17c to each other is connected, and to which a display driving circuit 49 for actuating a display means 48 to be described later is connected. The shift driving circuit 47 actuates a front axle shift means 51 comprising the sleeve 18, shift rod 21 and so on.

Figure 4C:
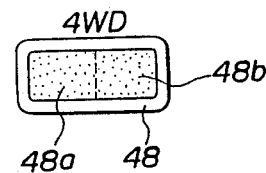

FIGS. 4B and 4C show the display means 48 comprising a pair of light emitting diodes 48a and 48b in which only the light emitting diode 48a is turned on to indicate that the sleeve 5 is shifted, but the shift is not completely finished from two to four-wheel drivings because the sleeve 18 is not shifted, while both the light emitting diodes 48a and 48b are turned on by the actuation of an axle shift switch (not shown) to indicate that the shift is finished completely when the sleeve 18 is shifted.

Figure 5:
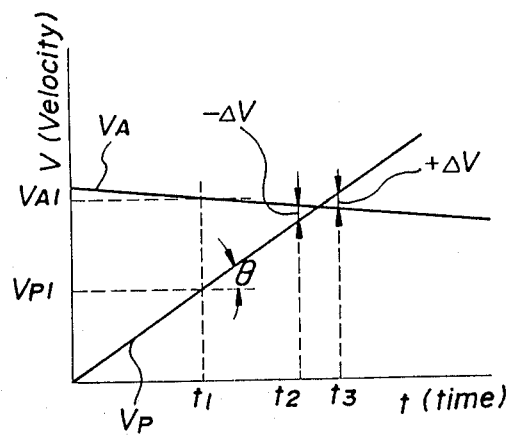
FIG. 5 is an explanatory diagram showing a relation between the time and velocities of a propeller and axle shafts in calculations in the embodiment according to the invention.
Figure 6:
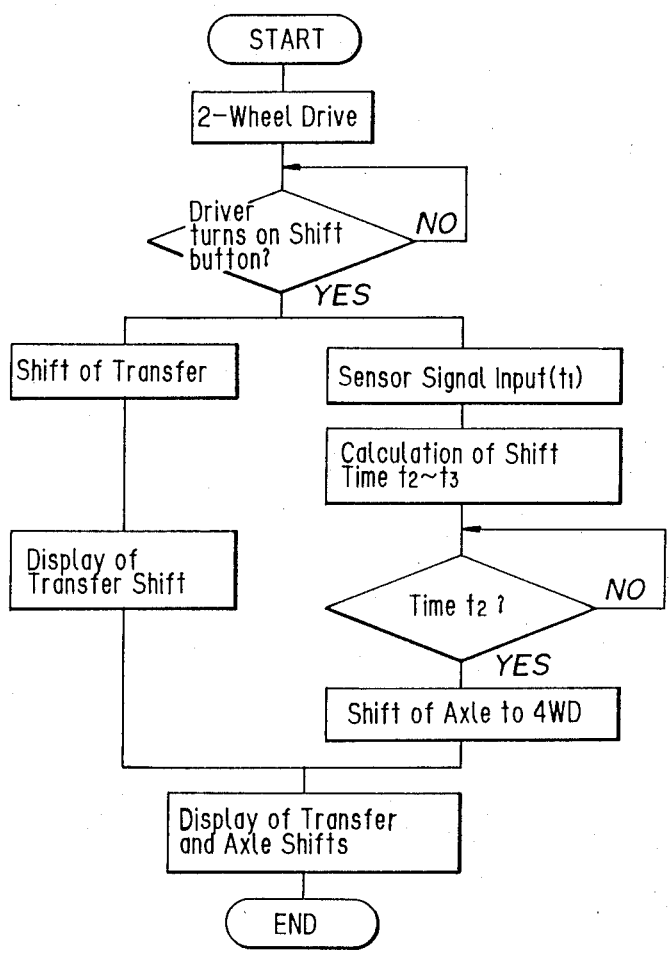
FIG. 6 is a flow chart showing an operation in the embodiment according to the invention.

In operation (FIG. 6), it is assumed that a car is running under two-wheel driving on a highway. Driving torque is conveyed through the clutch means C/L and transmission means T/M from an engine to the output shaft 1 of the transfer means T/F, and further therefrom to rear wheels. During the running of the car, the driver turns on the four-wheel drive button 39 because rain or wind is heavier. As a result, the two to four-shift signal producing circuit 40 and front axle shift actuating circuit 53 are actuated. Consequently, negative pressure is supplied to the cylinder chamber 7a of the vacuum means 6 by a signal from the circuit 40 so that the sleeve 5 is moved in the right direction in FIG. 2 to result in the connection between the clutch gear 2 and hub 3 whereby the revolution of the output shaft 1 is conveyed through the clutch gear 2 and hub 3 to the sprocket drive 4, and further through the chain 12 and sprocket driven 13 to the propeller shaft 14. The shift rod 34 is also moved by the actuation of the vacuum means 6 to actuate the two to four-shift finishing switch 35. The driver in the car can know by the display 48 in which only the light emitting diode 48a is turned on as shown in FIG. 4B that the shift of the sleeve 5 in the transfer means T/F is finished, but the shift member of the front axle is not shifted. At this time, the sensors 22 and 23 are actuated in accordance with a signal from the front axle shift actuating circuit 53. As shown in FIG. 5, the sensor 22 detects the revolution velocity $V_{P1}$ of the propeller shaft 14 at the time $t_1$, while the sensor 23 detects the revolution velocity $V_{A1}$ of the axle shaft 17c which is driven from the road. Further, the revolution velocities $(V_{P1}+\Delta V_{P1})$ and $(V_{A1}+\Delta V_{A1})$ are detected at the time $(t1 +\Delta t1)$, where $\Delta$ is a minute value. The control unit 42 controls the calculation unit 44 to conduct predetermined calculations based upon the signals of the revolutions velocities. In the calculation therein, the velocity-inclinations are calculated in accordance with the differential values $\Delta V_{P1}/\Delta t$ and $\Delta V_{A1}/\Delta t$, and the time duration $t_2$ to $t_3$ during which the velocity difference is less than a predetermined value $|\Delta V|$ between the propeller shaft 14 and axle shaft 17c is also calculated in accordance with the velocities $V_{P1}$ and $V_{A1}$ and velocity-inclinations thus calculated. When a time is at $t_2$, that is, when the time $t_2$-$t_1$) is counted from the time $t_1$, the control unit 42 controls the shift driving circuit 47 to move the shift rod 21 in the upper direction of an arrow in FIG. 1 so that the hub 19 and clutch 20 are connected by the sleeve 18. At this moment, the front axle shift finishing switch (not shown) is actuated so that both the light emitting diodes 48a and 48b are turned on in the display means 48 as shown in FIG. 4C. Consequently, the shift is smoothly performed from two to four-wheel drivings without producing any sound or noise even in a high speed running because the velocity difference is less than predetermined value between the propeller shaft and front axle shaft.

Although photosensors are used as the sensors 22 and 23 in the embodiment described above, magnet sensor, tacho-generator, high frequency oscillating proximity switch etc. may be employed, and the position thereof is not limited to one illustrated in FIGS. 1 and 2. Further, the shift member for the front axle shaft may be provided on the both sides of the differential means, although only one is provided on the one side thereof.

On the contrary, the shift member of the transfer means is disconnected after that of the front axle means is disconnected, when the shift is to be performed from four to two-wheel drivings.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for controlling the shift between two and four-wheel drive through a transmission means and a transfer means including a first shift member comprising,
   first means for detecting the rotational speed of a propeller shaft for wheels to which driving torque is interrupted under two-wheel drive condition,
   second means for detecting the rotational speed of an axle shaft for said wheels,
   a second shift member associated with said axle shaft,
   means for calculating a predetermined time duration during which the difference between the rotational speeds of said propeller and axle shafts is less than a predetermined value as detected by said first and second detecting means when said first shift member of said transfer means is shifted from two to four-wheel driving conditions, and means for controlling said second shift member associated with said axle shaft and causing said second shift member to be shifted during said predetermined time duration to complete the shift from two to four-wheel drive.

2. An apparatus for controlling the shift between two and four-wheel drive according to claim 1, wherein said means for calculating calculates the rate of change of the difference in said rotational speeds and calculates said predetermined time duration in accordance with the rate of change in addition to said difference in rotational speeds.

3. An apparatus for controlling the shift between two and four-wheel drive according to claim 1 further comprising, means for displaying two conditions in a shift from two wheel to four-wheel drive wherein one condition is that only said first shift member of said propeller shaft is shifted, and the other condition is that said second shift member associated with said axle shaft is shifted after the shift of said propeller shaft whereby the shift from two to four-wheel drive is completed.

4. An apparatus for controlling the shift between two to four-wheel drive according to claim 3, wherein said means for displaying comprises a pair of light emitting diodes, one of said light emitting diodes being turned on under said one condition, and all of said pair of said light emitting diodes being turned on under said other condition.

* * * * *